Jan. 16, 1968     E. A. VON SEGGERN ET AL     3,363,611
FULL PRESSURE CYCLE ENGINE WITH EXCESS AIR
Filed April 29, 1965
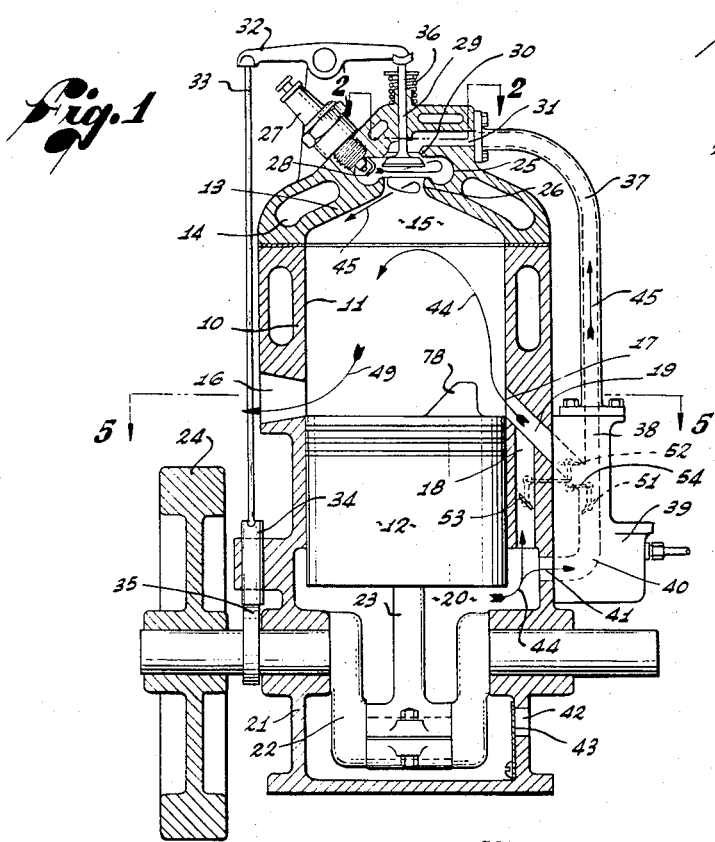
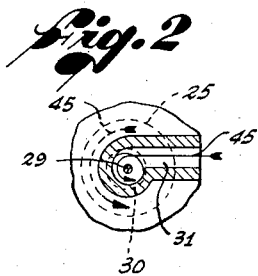
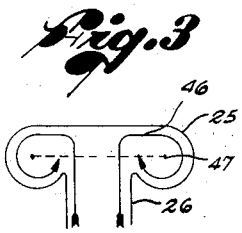
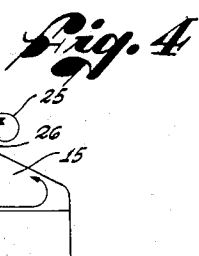
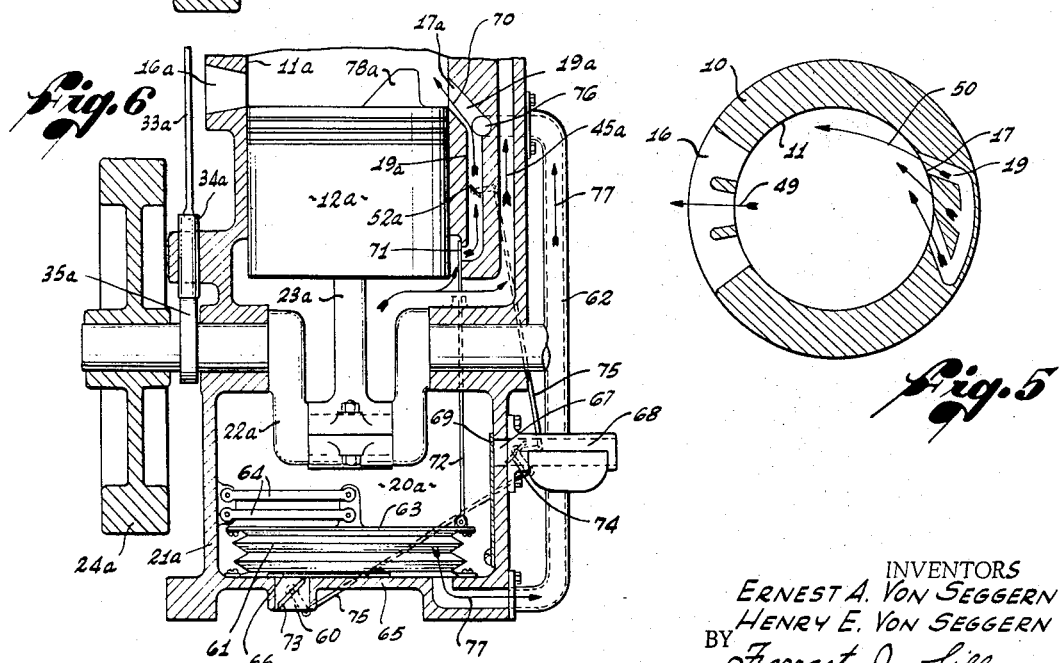
INVENTORS
ERNEST A. VON SEGGERN
HENRY E. VON SEGGERN
BY Forrest J. Lilly
ATTORNEY

United States Patent Office 3,363,611
Patented Jan. 16, 1968

3,363,611
FULL PRESSURE CYCLE ENGINE WITH EXCESS AIR
Ernest A. von Seggern, 1051 E. Angeleno, Burbank, Calif. 91501, and Henry E. von Seggern, Rte. 2, Box 1910, Escondido, Calif. 92025
Filed Apr. 29, 1965, Ser. No. 451,720
9 Claims. (Cl. 123—65)

This invention relates to an internal combustion engine of the two cycle type and a combustion process therefor which utilize a heterogeneous working fluid in combination with a separate homogeneous ignition charge. More specifically it relates to an engine and a combustion process of this class in which the working fluid is composed of variable proportions of fuel, air in excess of stoichiometric requirements, and recycled exhaust gas, and the ignition charge is composed of a substantially stoichiometric fuel-air mixture. It also relates to an engine and combustion process of this class in which the components of the heterogeneous working fluid may be principally mixed together prior to combustion, or may be substantially stratified, and the localized ignition charge is ignited by electric spark or other conventional means.

This invention follows in part the basic principles disclosed in our copending applications entitled, Mixture Separation Means and Fuel Supply Means for Excess Air Cycle Engine, Ser. No. 398,219, filed Sept. 22, 1964, Internal Combustion Engine Process and Apparatus Having an Augmented Pressure and Temperature Cycle, Ser. No. 369,091, filed May 21, 1964, and Excess Air Cycle Engine and Air Supply Means and Method of Operating Same, Ser. No. 303,116, filed Aug. 19, 1963.

It is a general object of the invention to provide a method of operation for a two cycle engine whereby the engine is enabled to fire small fuel charges evenly during idle operation, and to operate more efficiently and with cleaner and odorless exhaust than has heretofore been possible.

A further object of the invention is to provide a method and means for introducing a heterogeneous working fluid and a homogeneous ignition charge into a two cycle engine and for keeping the working fluid and ignition charge separated up to the time of ignition. It is a further object to provide means for directing the ignition flame into the working fluid after ignition in a toroidal flow pattern which envelops the entire working fluid. Another object is to provide means for supplying excess air and fuel to the working fluid and means for phasing the introduction of the air and the fuel thereto. It is also an object of the invention to provide a simple fuel system for an engine of this class. Other objects and means will be described in conjunction with several embodiments of the engine to be described.

Two cycle engines are full pressure cycle engines, even though the power control may be achieved by means of throttling the fuel mixture admitted to the engine crankcase. There is accordingly a preponderance of exhaust gases in the cylinder at light load and idle operation, and combustion is normally poor and uncertain. By localizing a small, substantially stoichiometric fuel-air charge in a chamber separate from, but in open communication with, the engine cylinder, good combustion is attained. It is necessary, however, to provide a chamber which will maintain the fuel charge in a localized condition during the compression cycle while exhaust gases are compressed into the chamber, and for this, a toroidally shaped cavity is provided. Gases from the cylinder compressed into the chamber along a central axis normal to the plane of the toroidal chamber induce a toroidal flow (smoke ring) in the chamber which concentrates the fuel mixture along the axis of spin therein and a spark plug ignites this mixture at the axis. The process is further enhanced by introducing a spin about the central axis normal to the plane of said toroidal cavity, both in said cavity and in said cylinder, prior to compression.

Combustion is also greatly improved if the exhaust gas in the cylinder is at least partially replaced by air. This is true, not only at idle operation but at part load, and accordingly means are provided for introducing this air in combination with the fuel mixture admitted to the cylinder in excess of that provided for the toroidal chamber, or ignition chamber, as it is defined. In some designs the excess air is mixed with the fuel-air mixture, making the mixture "lean." In other designs, the air is introduced separately in advance of the fuel-air mixture, to provide a certain degree of stratification. When the air is introduced so as to place the body of excess air between the fuel-air mixture and the exhaust port, the loss of fuel through the exhaust port during scavenging of the cylinder is also minimized.

The engine described herein is shown in one embodiment in which air only is compressed in the crankcase, and the fuel-air mixture is supplied by a pressure operated carburetor, and in another embodiment with a more conventional arrangement in which a fuel-air mixture is compressed in the crankcase. Both types are provided with means for supplying excess air to the cylinder. It is understood, however, that air may be supplied by means other than crankcase compression, as, for instance, by the use of blowers, etc. In operation the engine has the same general high thermal efficiency, particularly at part load, and the clean, odorless and non-smog inducing exhaust already described in the applications referred to above, but has these important features in a simple two cycle engine of substantially conventional design.

In the accompanying drawings, showing typical illustrative embodiments of the invention:

FIG. 1 is a vertical cross-section of a basic form of the invention;

FIG. 2 is a horizontal cross-section of the ignition chamber, taken along the line 2—2 of FIG. 1;

FIG. 3 is a diagrammatic sketch of the ignition chamber, in enlarged scale, showing gas flow lines during compression;

FIG. 4 is a diagrammatic vertical cross-section of the ignition and combustion chambers, showing gas flow lines during combustion;

FIG. 5 is a diagrammatic horizontal cross-section of the engine cylinder, taken along the line 5—5 of FIG. 1, showing gas circulation in the cylinder during compression; and FIG. 6 is a vertical cross-section of the lower cylinder and crankcase of a second embodiment of the engine showing auxiliary air supply means.

The engine shown in FIG. 1 is a two cycle, water cooled type, although the principles to be described may be equally well applied to air cooled types. A cylinder block 10 having a cylinder bore 11 with reciprocating piston 12 therein has a cylinder head 13 on the upper end, and both the cylinder and the head are water cooled by means of jacket 14. A combustion chamber 15 of substantially hemispherical design is formed in head 13, and exhaust ports 16 are provided on the side of said cylinder. Intake ports 17 are located substantially opposite said exhaust ports, and communicate, via passages 18 and 19, with the crankcase 20 inside the lower engine frame 21. The usual crank shaft 22, connecting rod 23, and flywheel 24 complete the basic engine structure.

A toroidal ignition chamber 25, which has substantially the form of a spheroid with its minor axis of revolution substantially coaxial with the central axis of said cylinder bore 11, is located above chamber 15 and is joined thereto by a short passage 26. A spark plug 27 is screwed into the head 13 in a position with its electrodes 28 extending out into the central portion of said ignition chamber. An intake valve 29 and valve seat 30 therefor are located in the top of chamber 25 substantially coaxial with passage 26. An intake manifold 31 leads tangentially to valve seat 30 as shown in FIG. 2, and thus communicates tangentially with ignition chamber 25 when valve 29 is open, as shown.

Intake valve 29 is operated by the usual rocker arm 32, push rod 33, tappet 34, and cam 35 on crank shaft 22, and is closed by spring 36. Intake manifold 31 is connected by an intake pipe 37 to branch passage 38, which latter passage joins intake passage 19 at a point further from the intake ports 17 than the juncture of air intake passage 18 with passage 19. A carburetor 39 is provided which has an air passage 40 therethrough, said passage joining passage 19 at its outlet end and joining passage 41 at its inlet end. Passage 41 communicates directly with crankcase 20. Carburetor 39 is of the type which operates at slightly above atmospheric pressure, with the air being pushed through it, rather than being drawn through at slightly less than atmospheric pressure. An air passage 42 admits air to crankcase 20, and is closed by the usual leaf spring 43 to prevent outflow.

In operation, the piston 12, during its upward stroke, draws air into crankcase 20 via passage 42 in the usual two cycle manner. When the piston comes back again to its low position as shown in FIG. 1, the air in the crankcase is compressed, and flows into cylinder 11 via passages 41, 40, 18 and 19 when the piston 12 uncovers the port 17. This is shown by flow line 44. Air only passes up passage 18, but the air passing through passage 40 picks up fuel in carburetor 39 to form the usual substantially stoichiometric fuel-air mixture, and this mixture, together with the air from passage 18 enter cylinder 11 and mix to produce a lean mixture therein.

Cam 35 on crank shaft 22 is designed to open valve 29 when intake port 17 is opened, and to hold said valve open during the duration of time port 17 is open. Consequently, the fuel-air mixture from carburetor 39, which flows through passage 19 toward said cylinder, divides and a portion flows up through passage 38, pipe 37, and manifold 31, through valve 29 and into ignition chamber 25 as shown by flow line 45. The tangential spin, induced in the flow by manifold 31, about the central axis of said cylinder and ignition chamber is shown in FIGS. 2 and 1. The mixture, after spinning about the periphery of chamber 25, spirals inwardly and flows down through passage 26 into the upper portion of chamber 15. This thoroughly purges the ignition chamber of exhaust gas.

During the compression stroke of piston 12, valve 29 is closed, and the gases in cylinder 11 are compressed into combustion chamber 15, and in part, into ignition chamber 25. These gases consist of exhaust gases not purged from the cylinder during the previous exhaust cycle, and the air and fuel mixture displaced into the cylinder through ports 17. The compression induced flow into ignition chamber 25 is shown in FIG. 3 by flow lines 46. The fuel mixture which entered the top of the combustion chamber 15 from the ignition chamber 25 is the first gas to be compressed back into said ignition chamber, and this is then followed by the lean fuel-air mixture and exhaust gases from the cylinder. The compressed gases flow radially outward, from passage 26, then turn down and inwardly, as shown, to produce a toroidal circulation about a circular axis 47. The fuel mixture is concentrated along said axis, while the other gases flow around the outside, and do not intermix appreciably therewith.

Near the end of the compression stroke, the long reach spark plug 27, with its electrodes 28 substantially on the axis 47 where the uncontaminated fuel-air mixture is concentrated, ignites said mixture, and the resultant combustion produces a flow pattern as shown by flow lines 48 in FIG. 4. The flaming gases flow inwardly, then flow down passage 26 onto the top of piston 12, and then spread radially outward and upward to produce a toroidal flow pattern in the combustion chamber 15. The initial combustion is fast and dependable, because the stoichiometric mixture is uncontaminated with exhaust gases, and the flame then envelops and ignites the fuel in the main combustion chamber 15 quickly and uniformly. The excess air present insures complete combustion, and combustion is fast, even in the presence of a preponderance of residual exhaust gases encountered at light load and idle operation. This combustion system insures even firing, and odorless combustion even when the engine is idling. It also provides freedom from detonation at full load even when operating with high compression because the ignition flame spreads very quickly through the entire mixture and does not compress unignited fuel mixtures into pockets where they may self-ignite. At the end of the power stroke, the burned gases escape through the exhaust port 16, as shown by flow line 49.

In order to more completely retain and localize the fuel mixture in chamber 25 during the compression cycle, it is necessary to compress back into said chamber the portion of the mixture that flowed out into the upper part of the main combustion chamber 15 during the charging cycle. This is most effectively accomplished if the gases in cylinder 11 circulate about the central axis thereof in the same direction as the mixture circulates in the ignition chamber 25 and the upper portion of chamber 15. This can be done by orienting the intake ports 17 somewhat tangentially in a horizontal plane as shown in FIG. 5 and obtaining an axial spin as shown by flow lines 50. It is understood that this spin is in reality a spiral flow upward as the ports are also inclined upwardly as shown in FIG. 1.

Two cycle engines are of necessity full pressure cycle types because it is not possible to reduce the pressure in the cylinder below atmospheric pressure at part load. Control of power is obtained by varying the quantity of new fuel-air mixture introduced each cycle, and this is accomplished by means of the throttle valves 51, 52, and 53, which are linked together by means of rods 54 so they all operate together. At full load, throttle 53 is closed while throttles 51 and 52 are open. No excess air is admitted from the crankcase, and a full fuel charge enters the cylinder and the ignition chamber simultaneously. At no load, idle operation, throttle 52 is closed, throttle 51 controls the quantity of mixture admitted to the ignition chamber, and throttle 53 is open to admit as much air as is desired. Combustion is greatly improved if some air is mixed with the residual exhaust gas in the cylinder. Enough air is available in the crankcase to almost completely purge the cylinder of exhaust gases if desired, but this may over cool the working fluid in the cylinder and best results are obtained if the air added is limited to moderate amounts.

At part load, throttles 51 and 52 open together while throttle 53 is gradually closed, producing a blend of air and mixture in the cylinder which insures clean and complete combustion; and the ignition chamber 25 is constantly supplied with an uncontaminated fuel-air mixture.

Oil to lubricate the engine may be supplied by a pump (not shown) which injects the oil into the incoming air stream in passage 42, before it enters the crankcase, in the known manner.

A second embodiment of the invention is shown in FIG. 6, which shows modification in the crankcase and ports, the cylinder head and ignition chamber being identical to those shown in FIG. 1. This engine differs from the first embodiment in the manner in which excess air is delivered to the engine cylinder, and also it is shown with the more common fuel system, in which the fuel mixture is drawn from a carburetor into the crankcase.

The air admitted to the cylinder in the first embodiment was mixed with the fuel mixture before entering the cylinder, so that a lean mixture was formed in said cylinder. In this second embodiment, the air is admitted prior to the admission of the fuel mixture, and the fuel mixture, when it is introduced into the cylinder, is not directly mixed with the air. It remains as a stratified charge, and the air stands between the fuel charge and the exhaust ports. By introducing the air first, it displaces the exhaust gases, and some may be lost out the exhaust ports in the process, but the late entering fuel mixture is not lost out of the ports. This is effective at idle and part load operation in preventing fuel loss from the exhaust ports. The substantially stoichimetric fuel mixture, essentially unmixed with excess air or exhaust gas, is also faster burning than when mixed in the usual manner.

In FIG. 6, parts identical with the engine shown in FIG. 1 are identified by the same numerals but with the suffix a added. The added parts include an air inlet passage 60 in crankcase 20a, which admits air to a bellows assembly 61 in said crankcase, and an air pipe 62 which conducts the air from said bellows to the intake passage 19a. The bellows assembly has a top plate 63 which is movably supported by toggle linkage 64 from the inside of crankcase 20a, and flexible, corrugated sides which join said plate and the bottom 65 in an air tight manner. A flexible leaf spring valve 66 admits air to said bellows from passage 60, but prevents its outflow. Another passage 67 opens into the portion of the crankcase including the piston 12a and crank shaft 22a, and a conventional carburetor 68 is joined thereto. A flexible leaf spring 69 admits fuel mixture to said crankcase but prevents its outflow. It is understood that the spring check valve means shown are illustrative only and that any other conventional means may be substituted therefor. The fuel mixture, after being compressed by the downward motion of piston 12a flows directly from the crankcase into passage 19a as shown by flow line 70, when mixture control valve 71 is open. This valve is operated by bellows 61 by means of link 72 which is pivotally connected to top plate 63.

The mechanism described is controlled by means of throttle 73 in air passage 60, throttle 74 in carburetor 68, and throttle 52a in passage 19a. These three throttles are connected together by link means 75 in such manner that when the throttle 52a is closed, throttle 74 in carburetor 68 is open sufficiently to idle the engine, and air throttle 73 is full open. As throttle 74 is opened, throttle 52a also opens, but air throttle 73 begins to close, until, at full load, when throttle 74 is full open, throttle 52a is also full open aid air throttle 73 is closed, or nearly so.

In operation, assume that piston 12a is rising and has just closed ports 16a and 17a. Bellows assembly 61 is assumed to be collapsed, i.e., top plate 63 is quite near the bottom 65 of said crankcase. In this position, valve 71 is open but passage 19a is closed at port 17a by piston 12a. As the piston creates a vacuum in said crankcase, air flows past throttle 73 into said bellows, while air flows through carburetor 68, producing a fuel mixture, and this enters said crankcase past throttle valve 74. The relative proportion of air which enters the bellows and fuel mixture which enters the crankcase is controlled by the position of said throttles. The entering air lifts said bellows to the position shown in FIG. 6 as piston 12a rises to the top of its stroke, when the engine is idling, or is operating at part load. This motion closes valve 71. At full load, it does not, of course, rise at all because throttle 73 is then closed.

When piston 12a descends, the gases in the crankcase are compressed, and since valve 71 is closed at this time, the only way the gas can move is to compress the air in bellows 61 and force the air therein out the pipe 62, into passage 19a at point 76, and through inlet port 17a into cylinder 11a when the piston uncovers said port. This is shown by flow line 77. After most of the air in the bellows has been forced into cylinder 11a, the top plate 63 has descended sufficiently to cause link 72 to open mixture control valve 71, and then the fuel mixture in said crankcase can flow out through passage 19a into cylinder 11a as shown by flow line 70. Thus, air enters the cylinder 11a first, and is followed by fuel mixture in a timed sequence, and in a manner variably controlled by the carburetor throttle 74 and associated mechanism as described.

The engine is shown with a rib 78 on the piston 12a to deflect the entering mixture upwardly in conventional two cycle manner, but this is not preferred. A better system is that known as loop flow scavenging which employs a simple flat top piston. The improvements described herein are applicable to any known scavenging system.

The use of a spring loaded poppet valve in the ignition chamber is also illustrative, and other valve means may be employed. Since oil is normally supplied with the fuel mixture, a slide, rotary, or piston and port type valve may be used which has no return springs and which is more suitable for extremely high speed operation. The valve need not be directly in said ignition chamber, but can be displaced therefrom a reasonable distance to facilitate construction. Similarly, the use of a flexible bellows to supply excess air in the second embodiment of the invention is also illustrative, as this could be replaced by a light, loose fitting piston in a housing or similar means. A tight seal between the air and fuel mixture is not required, as considerable intermixture takes place in the cylinder later in any event. Any type of separating membrane or diaphragm is suitable when the system is operated by air pressure. Of course, a more complex mechanically driven air pump could also be used, but the simple crankcase pressure operated system shown is preferred.

It is understood that the engine is not limited to the precise structure shown and described, but also includes such modifications as may be embraced within the scope of the appended claims.

We claim:

1. In a two cycle internal combustion engine, of the spark ignition type, the combination of:
   a combustion chamber in communication with said cylinder;
   an ignition chamber substantially in the form of a spheroid, which is a figure of revolution about its minor axis;
   a passage substantially coaxial with the minor axis of said spheroid joining said ignition chamber to said combustion chamber;
   fuel air mixture supply means for said ignition chamber;
   separate fuel air mixture supply means for said combustion chamber; and
   spark ignition means in said ignition chamber.

2. A combination as in claim 1 in which the point of ignition of said ignition means in said ignition chamber is located substantially on the circular axis of the toroidal cavity formed by the spheroidal ignition chamber.

3. A combination as in claim 1 in which the axis of the passage joining said spheroidal ignition chamber to said cylinder is substantially coaxial with said cylinder.

4. A combination as in claim 1 in which the fuel supply means for said ignition chamber includes flow directing means which directs the fuel mixture supplied thereto to flow in a circulating manner about the minor axis of said chamber.

5. A combination as in claim 4 in which the fuel supply means for said combustion chamber includes flow directing means which directs the fuel mixture supplied thereto to flow in a circulating manner about the length axis of said cylinder and in the same direction of rotation as said fuel mixture in said ignition chamber.

6. In a two cycle internal combustion engine having a cylinder and piston, the combination of:
   a combustion chamber in communication with said cylinder;
   an ignition chamber in communication with said combustion chamber but separate from said cylinder;
   means for supplying a fuel-air mixture to said ignition chamber;

means for supplying a fuel-air mixture to said cylinder and combustion chamber, including a first flow control valve for varying the quantity of mixture delivered;

means for supplying air to said cylinder and combustion chamber including a second flow control valve for varying the quantity of air delivered; and means connecting said first and second flow control valve means in a manner whereby one of said valves is open when the other is closed, and vice versa, and a substantially fixed quantity of working fluid, consisting of air and fuel-air mixture in variable proportions, is supplied to said cylinder at all conditions of operation to purge said cylinder of residual exhaust gases.

7. A combination as in claim 6 in which a third flow control valve means is provided, in combination with the fuel-air mixture supply means for said cylinder, which controls the flow of fuel-air mixture into said cylinder, and is coordinated with said air supply means to retard the delivery of fuel-air mixture to said cylinder until the air has been delivered.

8. In a two cycle internal combustion engine having a cylinder and piston and crankcase, the combination of:
  means for supplying a fuel-air mixture to said engine crankcase;
  a first flow control means for varying the quantity of fuel-air mixture supplied to said crankcase;
  a combustion chamber in communication with said cylinder;
  an ignition chamber in communication with said combustion chamber but separate from said cylinder;
  a first passage from said crankcase to said ignition chamber;
  a second passage from said crankcase to said cylinder and combustion chamber;
  a second flow control valve in said second passage;
  air pump means for delivering air under pressure;
  a passage from said air pump means to said cylinder and combustion chamber;
  a third flow control means in combination with said air pump means to control the quantity of air delivered to said cylinder;
  control means connecting said first, second and third flow control means in a manner to open and close said first and second valve means in a substantially parallel manner and said third valve means in an inverse manner whereby said third valve means is open when said first and second means are closed and vice versa; and
  a fourth flow control valve means in said second passage from said crankcase to said cylinder, operated by said air pump means which closes said fourth control means when said pump is delivering air to said cylinder, and opens said control means after said air is delivered.

9. In the operation of an internal combustion engine of the two cycle, spark ignition type having a cylinder and piston, and which utilizes two separate bodies of working fluid having a different composition of fuel, air and residual exhaust gas, the method of supplying fuel to said engine and holding said bodies of working fluid separate at least prior to the time of ignition, which includes as steps:
  supplying a first body of working fluid containing variable proportions of fuel and air to said engine cylinder to purge said cylinder of residual exhaust gases at least in part;
  separately supplying a second body of working fluid consisting of a substantially stoichiometric proportion of fuel and air to a remote region of said cylinder;
  directing said first body of working fluid, at least in part, during the compression cycle of said engine to flow centrally through said second body of working fluid and then radially outward and around an axis of rotation in a toroidal circulation;
  retaining said second body of working fluid substantially along said axis of rotation; and
  igniting said second body of working fluid at a point near the axis of rotation.

References Cited

UNITED STATES PATENTS

| Re. 18,429 | 4/1932 | Peterson | 123—65 |
| 924,856 | 6/1909 | Thomson | 123—65 |
| 927,001 | 7/1909 | Nichols | 123—73 |
| 1,354,786 | 10/1920 | Tartrais | 123—65 |
| 1,525,187 | 2/1925 | Indlekofer | 123—73 |
| 1,677,305 | 7/1928 | Sperry | 123—65 |
| 1,691,302 | 11/1928 | Peterson | 123—65 |
| 2,034,093 | 3/1936 | Gehrandt | 123—65 |
| 2,156,665 | 5/1939 | Mallory | 123—32 |
| 2,773,489 | 12/1956 | Estes | 123—73 |
| 2,914,041 | 11/1959 | Froehlich | 123—32 |
| 3,244,159 | 4/1966 | Meurer | 123—32 |

FOREIGN PATENTS 341,830  7/1936  Italy.

WENDELL E. BURNS, *Primary Examiner.*